(12) United States Patent
Pierson

(10) Patent No.: US 7,279,871 B2
(45) Date of Patent: *Oct. 9, 2007

(54) VOLTAGE REGULATOR AND METHOD OF REGULATING VOLTAGE

(75) Inventor: Martin Pierson, Howell, MI (US)

(73) Assignee: Lionel LLC, Chesterfield, MI (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/034,080

(22) Filed: Jan. 12, 2005

(65) Prior Publication Data

US 2005/0184197 A1 Aug. 25, 2005

Related U.S. Application Data

(60) Provisional application No. 60/535,887, filed on Jan. 12, 2004.

(51) Int. Cl.
*G05F 1/10* (2006.01)
(52) U.S. Cl. ..................................... 323/237
(58) Field of Classification Search ................ 323/237, 323/241, 261, 282, 283, 320, 351
See application file for complete search history.

(56) References Cited

U.S. PATENT DOCUMENTS

| | | | |
|---|---|---|---|
| 5,365,157 A * | 11/1994 | Geller et al. ................ 323/237 |
| 5,856,740 A | 1/1999 | Rau et al. | |
| 6,108,215 A * | 8/2000 | Kates et al. .................. 363/17 |
| 6,281,606 B1 | 8/2001 | Westlake | |
| 6,831,449 B2 * | 12/2004 | Nishida et al. ............. 323/284 |
| 7,091,706 B2 * | 8/2006 | Pierson ....................... 323/237 |
| 2005/0270097 A1 * | 12/2005 | Coleman .................... 330/251 |

* cited by examiner

Primary Examiner—Adolf Berhane
(74) Attorney, Agent, or Firm—O'Melveny & Myers LLP

(57) ABSTRACT

A voltage regulator is configured to regulate an alternating current source provided to a model toy railroad layout. The voltage regulator delivers a substantially constant voltage level to the features and accessories drawing power from the third rail of the railroad layout. The voltage regulator comprises a load control unit having an output configured to be coupled to a load. The load control unit is responsive to a load control signal for controlling the delivery of current to the load during at least a portion of an alternating current waveform. A feedback unit is coupled to the output of the load control unit and is configured to produce a feedback signal indicative of an average voltage level of the alternating current source applied at the output. A controller is responsive to the feedback signal and is configured to generate the load control signal such that the average voltage level substantially corresponds to a predetermined reference voltage level. The controller may be further configured to receive a user input signal defining the reference voltage level.

16 Claims, 3 Drawing Sheets

VOLTAGE REGULATOR AND METHOD OF REGULATING VOLTAGE

RELATED APPLICATION DATA

This patent application claims priority pursuant to 35 U.S.C. § 119(c) to provisional patent application Ser. No. 60/535,887, filed Jan. 12, 2004, the subject matter of which is incorporated herein in its entirety.

FIELD OF THE INVENTION

The present invention relates generally to model toy railroad layouts. More particularly, the present invention relates to a voltage regulator for model toy railroad layouts and a method for regulating the voltage supplied to a load of a model toy railroad layout.

BACKGROUND OF THE INVENTION

Model toy railroads have been in existence for many years. In a typical model toy railroad layout, the model train engine is an electrical engine that receives power from a voltage that is applied to the tracks and picked up by the train motor. A transformer is used to apply the power to the tracks while contacts on the bottom of the train, or metallic wheels of the train, pick up the applied power for the train motor. The transformer controls both the amplitude and polarity of the voltage, thereby controlling the speed and direction of the train. In HO systems, the voltage is a DC voltage. In O-gauge systems, for example, the track voltage is an AC voltage transformed by the transformer from the 60 Hz, 120 volt AC line voltage provided by a standard wall socket, to a reduced AC voltage (e.g., 0-18 volts AC).

Over the course of time, model toy railroad layouts have been developed so as to make their operation more closely resemble that of actual trains and railroad layouts. These developments have taken the form of providing model trains with various operating features and providing railroad layouts with a number of railroad accessories. For instance, many model trains are provided with lighting systems to allow for the illumination of headlights and other lighting features of a train in order to accurately capture a realistic depiction of an operating train. Many model trains are also equipped with smoke generating and sound generating devices that serve to produce smoke and sound to mimic the generation of smoke and sound of real trains. Similarly, railroad accessories, such as, for example, railroad crossings, lamp posts and illuminated buildings are also common in model toy railroads.

To utilize these operating features and accessories, however, power needs to be supplied to the respective devices. The power provided to these features and accessories typically comes from the line voltage provided to the system via the third rail of a railroad layout. One shortcoming that exists with conventional types of model toy railroad layouts is that the power provided to the features and accessory devices can fluctuate due to sudden changes in the track voltage (e.g., a surge of power or a dip in power that can be caused by track irregularities) or the sudden change in load resistance (e.g., the addition or removal of operating features and/or accessories). Consequently, these fluctuations can degrade the performance of the operating features or accessory devices, or alter in an undesirable way the operation of an operating feature or accessory. For instance, if the fluctuation is due to a spike in the track voltage, the fluctuations can be damaging to the load element of the operating features or accessory devices as too much power will be provided to the devices. Similarly, if the magnitude of these fluctuations is such that less than optimal power is provided to the operating features or accessories, the fluctuation can be detrimental to the overall objective of realism, as the operating features or accessories will not perform at their optimal level. Finally, fluctuation of the voltage may be undesirable when a uniform effect (e.g., lighting effect) is desired.

There is, therefore, a need for a model toy railroad layout that will minimize and/or eliminate at least one or more of the above-identified deficiencies.

SUMMARY OF THE INVENTION

The present invention overcomes the deficiencies of the prior art by providing a voltage regulator to regulate an alternating current source provided to a model toy railroad layout. The voltage regulator delivers a substantially constant voltage level to the features and accessories drawing power from the third rail of the railroad layout.

In an embodiment of the invention, the voltage regulator comprises a load control unit having an output configured to be coupled to a load. The load control unit is responsive to a load control signal for controlling the delivery of current to the load during at least a portion of an alternating current waveform. A feedback unit is coupled to the output of the load control unit and is configured to produce a feedback signal indicative of an average voltage level of the alternating current source applied at the output. A controller is responsive to the feedback signal and is configured to generate the load control signal such that the average voltage level substantially corresponds to a predetermined reference voltage level. The controller may be further configured to receive a user input signal defining the reference voltage level.

More particularly, the controller further includes a comparator configured to compare the feedback signal with the predetermined reference voltage level and to alter the load control signal accordingly. The controller may further comprise a microprocessor or like control circuitry. The load control unit may further include a bi-directional switching device having one terminal operatively connected to a system power source, a second terminal operatively connected to the output of the controller, and a third terminal operatively connected to the load. The switching device may further comprise a triac, with the load control signal operative to control a phase-conduction angle of the triac. A zero-cross detection unit is operatively connected between the system power source and the controller, and is configured to detect a zero crossing of the alternating current waveform. The controller is configured to determine a timing signal of the alternating current waveform from the detected zero crossing, thereby controlling activation timing of the load control signal using the timing signal. The controller may be further configured to provide proportional-integral (PI) control of the load.

In another embodiment of the invention, a method of regulating voltage comprising the steps of supplying an alternating current source to a load, sampling the alternating current source to determine an average voltage level, comparing the sampled average voltage level to a predetermined reference voltage level to determine a deviation, and adjusting voltage of the alternating current source supplied to the load responsive to the deviation by restricting current conduction during at least a portion of a cycle of the alternating current source. The method may further include receiving an input signal defining the predetermined reference voltage. The sampling step further includes generating a feedback signal indicative of the sampled average voltage level. The adjusting step further comprises adjusting a conduction time of a bi-directional switching device, or adjusting a phase-conduction angle of a bi-directional switching device.

These and other objects and features of this invention will become apparent to one skilled in the art from the following detailed description and accompanying drawings illustrating features of this invention by way of example.

DETAILED DESCRIPTION OF THE INVENTION

Figure 1:
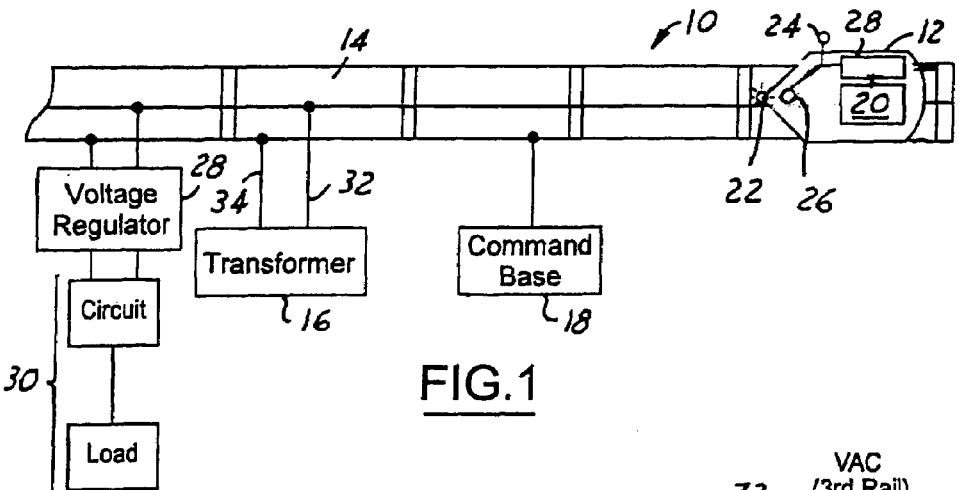
FIG. 1 is a simplified diagrammatic and block diagram view of a model toy railroad layout.

Referring now to the drawings wherein like reference numerals are used to identify identical components in the various views, FIG. 1 illustrates a model toy railroad layout 10. Railroad layout 10 includes at least one model train 12, a track 14 upon which train 12 travels and a transformer 16. Railroad layout 10 may also include a command base 18, provided the model toy train is equipped with command control, which will be discussed below.

Train 12 includes electronic system 20, which can be any electronic circuits or device mounted upon model train 12. For example, electronic system 20 may include electronic circuits that control various operating features of the train, such as lights 22, a horn 24 and/or a smoke generating device 26, as shown in FIG. 1. In accordance with the present invention, electronic system 20 may be powered by a power source regulated by a voltage regulator 28. The inventive voltage regulator 28, which will be discussed in greater detail below, ensures that the power provided to the aforementioned operating features of model train 12 is maintained at a constant level notwithstanding fluctuations in track voltage or load (impedance) fluctuations. The regulated voltage improves the functionality and performance of the operating features, while at the same time minimizing the risk of overload, and therefore, potential damage to the power handling devices or load elements of the operating features. While voltage regulator 28 is described above in connection with operating features of a model train 12, it should be noted that voltage regulator 28 can be implemented in other applications. For instance, voltage regulator 28 may also be used in connection with control circuitry for other model toy railroad accessories 30, such as, for example, railroad crossings, lamp posts, illuminated buildings, other trackside accessories, or any other device associated with model toy railroad layouts whose operation will improve as the level of regulation of the power source increases.

With continued reference to FIG. 1, transformer 16 provides a power source for the model toy railroad layout 10. Transformer 16 supplies power to track 14 through connectors 32, 34, while command base 18 may be powered by a conventional wall outlet. Connector 32 connects the power terminal of transformer 16 to the center rail, or third rail of track 14, and connector 34 connects the ground or common terminal of transformer 16 to the outside rail of track 14. Transformer 16 can be a conventional AC or DC transformer, depending on the requirements of railroad layout 10, and in particular, model train 12. Additionally, transformer 16 may provide a fixed output, a variable output, or both. In one embodiment, railroad layout 10 is an O-gauge layout and transformer 16 is an AC transformer which transforms typical AC line voltage (e.g., 120 VAC) to a reduced level (e.g., 0-18 VAC for a conventional O-gauge variable output model train transformer) and supplies the same to track 14.

As described above, train 12 of model toy railroad layout 10 may be equipped to operate in accordance with a command control scheme to control the operation of, among other things, the operating features thereof. Of course, as already noted, train 12 may be configured for operation in accordance with a conventional control approach (i.e., variable track power level). The assignee of the present invention provides command control products under its TRAIN-MASTER trademark consistent with at least portions of U.S. Pat. Nos. 5,251,856, 5,441,224 and 5,749,547 issued to Young et al., each of which is hereby incorporated by reference in its entirety.

Figure 2:
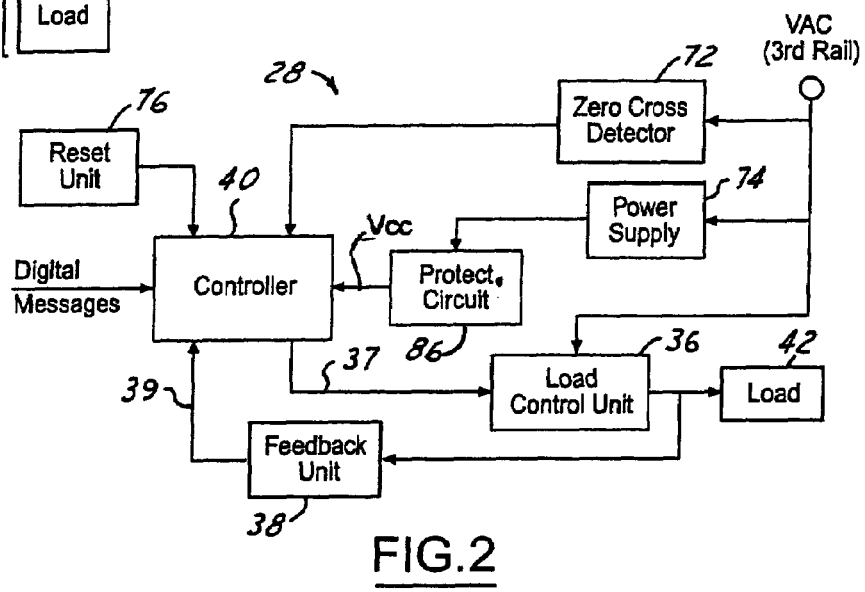
FIG. 2 is a schematic and block diagram view of a voltage regulator portion of the layout of FIG. 1 in accordance with the present invention.

With reference to FIG. 2, an embodiment of the inventive voltage regulator 28 is illustrated. As briefly described above, voltage regulator 28 is provided so as to allow for the control of the power provided to the operating features (e.g., lights, sound, smoke generating device, etc.) or other accessories (e.g., railroad crossings, lamp posts, etc.) that are associated with train 12 and railroad layout 10 at selected voltage levels. Regulator 28 regulates the output voltage provided thereby to a predetermined average level, so as to provide regulated power to these features and accessories over a broad range of input track voltages and fluctuating load impedances, reducing the risk of overload and damage to the features and accessories. Voltage regulator 28 includes a load control unit 36, a feedback unit 38 and a controller 40.

Figure 3:
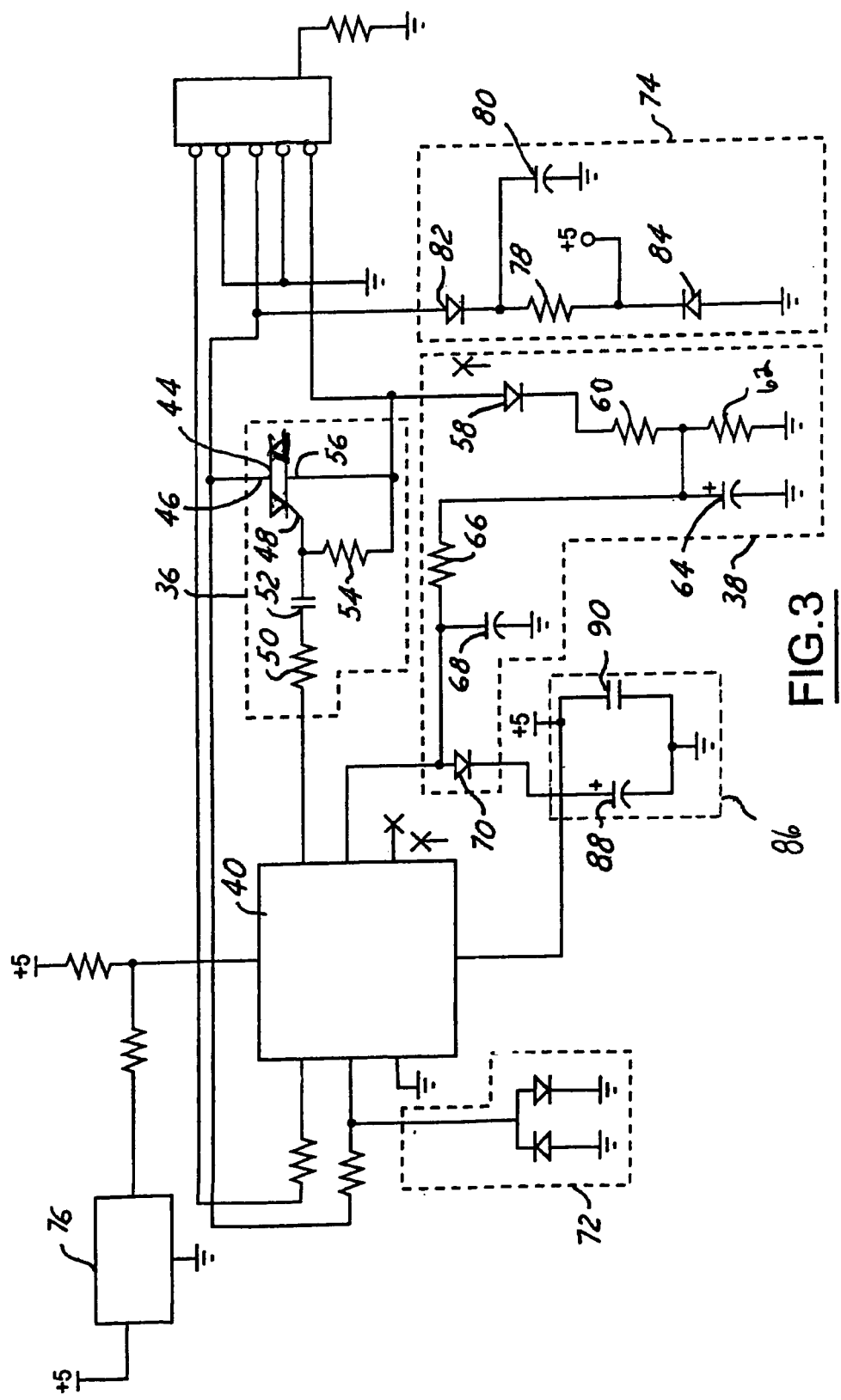
FIG. 3 is a schematic diagram showing, in greater detail, the voltage regulator of FIG. 2.

Load control unit 36 is responsive to a load control signal 37 for controlling the delivery of power to a load 42, described in greater detail below. Load control unit 36 is configured so as to have an input and an output. The input of load control unit 36 is connected to an output of controller 40, and the output of load control unit 36 is configured to be coupled to load 42. Load 42 may be any one or more of the aforementioned operating features of train 12 or model toy railroad accessories 30, or any other electrical load as that term is understood in the electrical arts, including any one or more of resistive, inductive, and/or capacitive components. With particular reference to FIG. 3, load control unit 36 may include a semiconductor based bi-directional switching device, such as a triac 44, which may be a commercially available component from ON Semiconductor, Phoenix, Ariz., under the Part No. T2322. It should be noted, however, that while in a preferred embodiment a triac device is used for the bi-directional switching device, this description is exemplary only and not limiting in nature. Other suitable power switching devices exist, such as MOSFETs and SCRs, that remain within the spirit and scope of this invention.

Triac 44 has at least three terminals, as known. A first terminal 46 is connected to the system power source (e.g., the center or third rail). A second terminal 48, or gate terminal, is connected to the output of controller 40 by way of the series combination of a first resistor 50 a first capacitor 52, which, in a constructed embodiment have values of 120 Ω and 5600 pf, respectively. A second resistor 54 is connected between the second terminal and a third terminal 56 of triac 44. Resistor 54, in a constructed embodiment, has a value of 1 kΩ. Third terminal 56 of triac 44 is additionally connected to load 42, thereby defining the output of load control unit 36.

With continued reference to FIGS. 2-3, in addition to load 42, the output of load control unit 36 is also coupled to an input of feedback unit 38. Feedback unit 38 is configured to sample the voltage level provided to load 42 at the output of load control unit 36. Feedback unit 38 is further configured to produce a feedback signal 39 indicative of the sampled voltage level, and to then provide this feedback signal to the output terminal of feedback unit 38. With particular reference to FIG. 3, feedback unit 38 includes a first diode 58 connected between load 42 and a third resistor 60, which, in a constructed embodiment, has a value of 560 Ω. Resistor 56 is further connected in series to a parallel combination of a fourth resistor 62, which, in a constructed embodiment has a value of 2MΩ, and a second capacitor 64, which, in a constructed embodiment is a 6.3V 0.1 μf capacitor. Diode 58 serves to rectify the AC voltage from the output of the load control unit 36. Resistor 62 and capacitor 64 are arranged to produce a voltage corresponding to a rectified average voltage across the load 42. This parallel combination is yet further connected in series to the parallel combination of a fifth resistor 66 and a third capacitor 68, providing a low pass filter to remove noise and other transient fluctuations of the detected average voltage. This signal is in turn connected to an input of controller 40, thereby defining the output of feedback unit 38. In a constructed embodiment, resistor 66 is a 2MΩ resistor and capacitor 68 is a 6.3V 0.11 μf capacitor. The output of feedback unit 38 is coupled to an input of controller 40 to allows for the transmission of feedback signal 39 to controller 40. The arrangement of resistors and capacitors define a transfer function configured to cooperate with a PI control loop implemented in controller 40.

In an alternative embodiment, the feedback unit 38 may be configured to perform a true RMS calculation rather than a rectified average. For example, a true-RMS circuit can be built by decomposing the RMS function: (i) square the signal, (ii) integrate over time, and (iii) take the square-root of the time average. While such a circuit would improve the accuracy of the feedback signal 39, the RMS circuit would also increase the complexity and cost of the voltage regulator.

With continued reference to FIGS. 2-3, controller 40, which in a constructed embodiment is a microprocessor unit, is responsive to feedback signal 39 produced by feedback unit 38 to generate the load control signal 37 such that said voltage level substantially corresponds to a predetermined reference voltage level. It should be noted, however, that while controller 40 may be a microprocessor unit, the functionality of controller 40 can be performed by equivalent analog or digital circuitry. Controller 40 is configured to receive inputs and to generate outputs; and is further configured with a predetermined reference voltage. This predetermined reference voltage, in one embodiment, may be programmed into controller 40. However, in a preferred embodiment, a user may define the reference voltage level by inputting the desired reference voltage level into controller 40. The controller 40, of course, would be provided with an interface configured to receive such predetermined, specific voltage level and to store the same.

In operation, controller 40 receives feedback signal 39 produced by feedback unit 38 and then processes this signal with respect to the predetermined reference voltage level described above. Controller 40 has a comparator module that is configured to compare feedback signal 39 with the predetermined reference voltage. Once the deviation, if any, between these signals is determined, controller 40 generates and/or alters load control signal 37 that is delivered to load control unit 36 in accordance with the determined deviation ("error signal") such that the output voltage level provided to load 42 at the output of load control unit 36 substantially corresponds to the predetermined reference voltage level. The load control signal 37, in a constructed embodiment, is generated by microprocessor 40 using a proportional-integral (PI) control strategy. Various PI control approaches are known in the art. Accordingly, the voltage supplied to load 42 is continuously sampled and processed under PI control in order to produce a load control signal 37 such that the output voltage level is at a constant, desired level.

With continued reference to FIGS. 2-3, voltage regulator 28 may further include a zero-cross detection unit 72, as known in the art, connected between controller 40 and the system power source (e.g., the center or third rail). Zero-cross detection unit 72 allows for both the phase-conduction angle control of triac 44, as well as the synchronization to TRAINMASTER communications that are input into controller 40. In particular, in the embodiment in which voltage regulator 28 is used in association with the operating features of the train 12, zero-cross detection unit 72 detects a zero-crossing point of the system power source from transformer 16 to track 14 flowing along the connection formed by the third rail and electrical contacts on train 12 which, in the United States, results in a 60 Hz timing reference signal. In the embodiment in which voltage regulator 28 is used in association with a railroad accessory, zero-cross detection unit 72 detects the zero-crossing point of the system power source from transformer 16 to track 14 flowing along by the connection formed by the circuitry of a railroad accessory and the third rail, which similarly results in a 60 Hz timing reference signal. The timing reference signal supplied by zero-crossing detection unit 72 is used by controller 40 to control triac 44 of load control unit 36. In operation, controller 40 calculates a phase-conduction angle for triac 44 based on feedback signal 39 and the predetermined reference (target) voltage. The phase-conduction angle is the total angle over which the flow of current to the load occurs through triac 44, delivering an average power from the system power source (i.e., center rail or third rail).

Controller 40 can alter the phase-conduction angle of triac 44 by sending load control signal 37, which takes the form of a phase conduction angle signal, to second or gate terminal 48 of triac 44. In particular, if the controller 40 determines that the average voltage detected by the feedback unit 38 is below the predetermined voltage level, the controller can increase the phase-conduction angle of triac 44 to thereby increase the power conducted to the load 42. Conversely, if the controller 40 determines that the average voltage detected by the feedback unit 38 is above the predetermined voltage level, the controller can decrease the phase-conduction angle of triac 44 to thereby reduce the power conducted to the load 42. This results in load control signal 37 providing a substantially limited and constant voltage at the output of triac 44.

Figure 4:
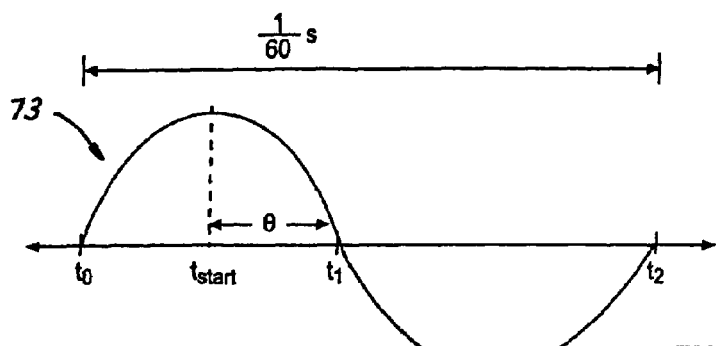
FIG. 4 is a waveform representing one cycle of the AC voltage applied to the track of a model toy railroad layout in accordance with the present invention.

It should be noted, however, that one characteristic of a triac or SCR device is that while the turning "ON" of the device can be physically controlled, the turning "OFF" can not. Consequently, once the device is triggered, it will remain in conduction until the current goes to zero. Therefore, in the constructed embodiment the conduction angle, once calculated, is implemented as follows. With reference to FIG. 4, wherein a waveform 73 representing one cycle of the track voltage is shown, the start time of conduction is calculated, designated as $t_{start}$, which corresponds to a conduction angle θ. Since the frequency of the track voltage signal is known (i.e., 60 Hz), the time between each zero-crossing point of the voltage signal is also known (i.e., the time between, for example, $t_0$ and $t_1$). Accordingly, the start time of conduction can be calculated based on the time corresponding to conduction angle θ taken back from the zero-crossing point that occurs at $t_1$. Once this start time is calculated, a timer is appropriately set to this start time so that following a delay of a predetermined amount of time from, for example, $t_0$ to $t_{start}$, the triac 44 will trigger and begin conduction of the appropriate level of power. This process essentially allows for the complete control of conduction since the conduction start time is set so as to trigger, and therefore maintain conduction for a period of time ending at the subsequent zero-crossing point when the current to the triac 44 goes to zero. The same process is followed with respect to the conduction of the triac during the negative half of the cycle. Accordingly, by controlling the phase-conduction angle of triac 44, it is possible to limit the voltage output of load control unit 36 to a constant level required to operate load 42.

It should be noted, however, that while a triac is used in the constructed embodiment of this invention, other power switching devices exist, such as MOSFET's driven by a pulse width modulation (PWM) control circuit, that can be used to carry out the same functionality. However, while these power switching devices, unlike triacs, have the benefit of being able to be both turned "ON" and turned "OFF", achieving bi-directionality is generally more difficult. Accordingly, triacs and other like devices are better suited for this application. Nonetheless, these other power switching devices can be implemented to carry out the necessary functionality.

With reference to FIGS. 2-3, in one embodiment, voltage regulator 28 further includes a power supply 74 and a reset unit 76, wherein reset unit 76 is connected to controller 40. Power supply 74 is configured to rectify the AC voltage on the track 14 to a constant predetermined DC supply voltage, designated as Vcc in the drawings. This supply voltage is used to power components of voltage regulator 28, such as controller 40. In a preferred embodiment, power supply 74 includes a parallel combination of a sixth resistor 78 and fourth capacitor 80 connected in between a third diode 82 that is, in turn, connected to both the system power source (e.g., third rail) and a zener diode 84, which is connected to ground. In a preferred embodiment, resistor 78 is a 1 kΩ resistor, capacitor 80 is a 35V 100 μf capacitor, and zener diode 84 is a 5.1V 1W zener diode. Voltage regulator 28 may further include a protection circuit 86 connected between the output of power supply 74 and controller 40. Protection circuit 86 is comprised of the parallel combination of a fifth capacitor 88 and a sixth capacitor 90, wherein, in a preferred embodiment, capacitor 88 is a 6.3V 100 μf capacitor and capacitor 90 is a 0.01 μf capacitor.

Figure 5:
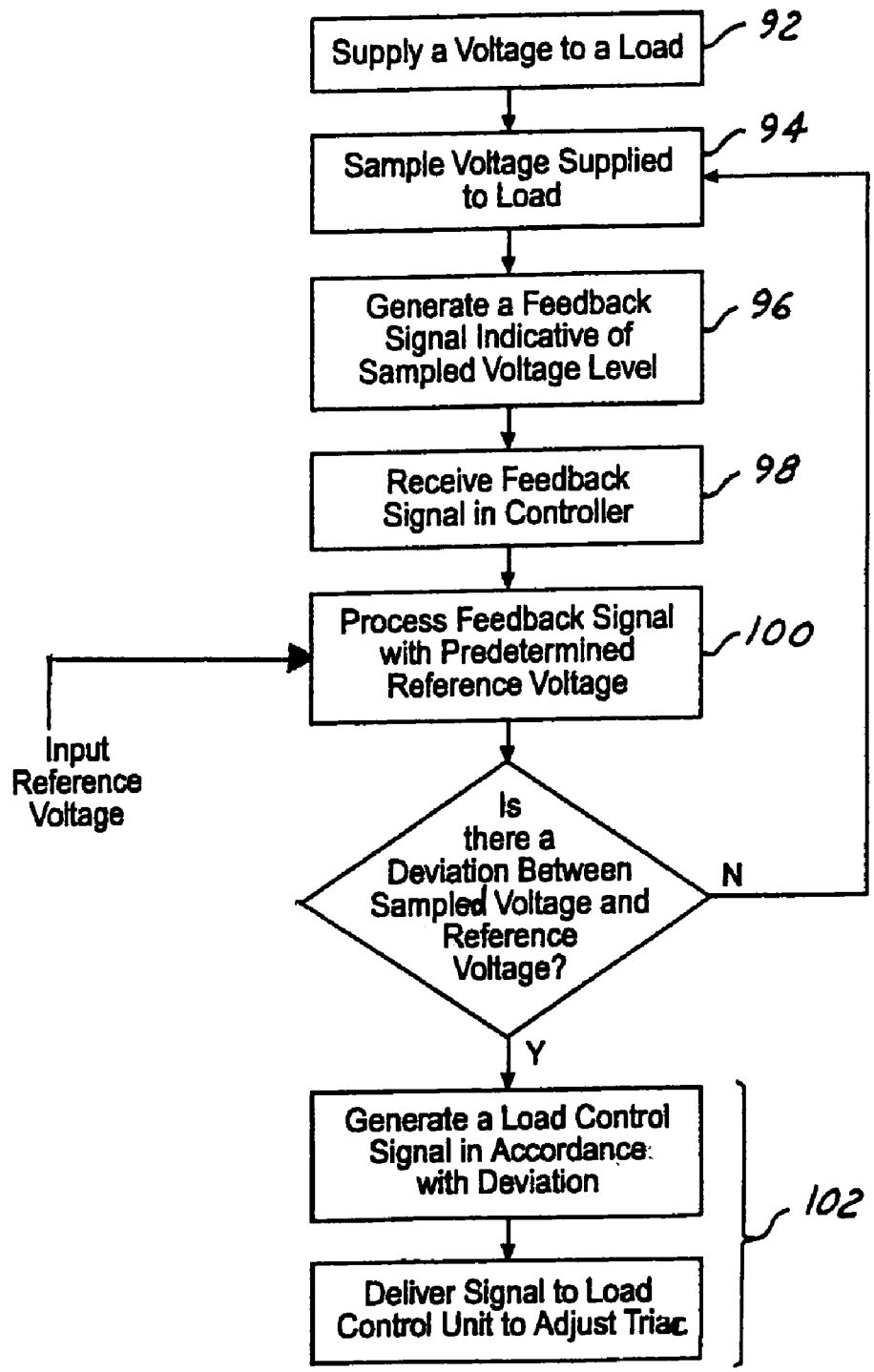
FIG. 5 is a flow chart diagram showing of a method of regulating voltage in accordance with the present invention.

With reference to FIG. 5, in a first step 92, load control unit 36 provides a voltage to a load 42 (e.g., operating features or railroad accessories) of model train 12 or layout 10. In a further step 94, feedback unit 38 samples the voltage on the output of load control unit 36. In still a further step 96, feedback unit 38 generates a feedback signal 39 that is indicative of the sampled voltage level. In yet still a further step 98, controller 40 receives feedback signal 39 over the connection between the output of feedback unit 38 and the input of controller 40. In still a further step 100, controller 40 processes this sampled voltage level in conjunction with a predetermined reference voltage level. Controller 40 performs this function by performing the substep of comparing the two voltage levels in order to determine a deviation between the actual voltage provided to load 42 and the predetermined reference voltage. In a preferred embodiment, this predetermined reference voltage is inputted into controller 40 by a user, however, as set forth above, the predetermined reference voltage may also be programmed into controller 40 without any user involvement. Once controller 40 processes the sampled voltage level with the reference voltage level, in step 102 controller 40 controls the voltage provided to load 42 in accordance with the deviation in order to maintain the control voltage at a predetermined level. In a preferred embodiment, controller 40 carries out this functionality by generating a load control signal 37 in accordance with a proportional-integral (PI) control strategy. This PI control strategy is known in the art. Once controller 40 generates load control signal 37, it communicates generated signal 37 to load control unit 36 to adjust the phase-conduction angle of triac 44 in order to make any adjustments or alterations to the voltage being supplied to load 42.

Accordingly, in light of the above, the inventive voltage regulator 28 allows the model toy train system to be responsive sudden changes in line voltage (e.g., a surge of power or a dip in power) and/or to sudden changes in load resistance (e.g., the addition or removal of operation features and/or accessories). It should be noted that while only those embodiments set forth above have been described in detail, other configurations and embodiments for the present invention exist that are within the spirit and scope of the invention.

What is claimed:

1. A voltage regulator for an alternating current source used for powering operating features of a model train, comprising:
    a load control unit having an output configured to be coupled to a model train operating feature, said load control unit being responsive to a load control signal for controlling the delivery of current to the operating feature during at least a portion of an alternating current waveform;
    a feedback unit coupled to said output of said load control unit and configured to produce a feedback signal indicative of a voltage level of said alternating current source applied at said output;
    a controller adapted to receive an input command pertaining to the operating feature, the controller being responsive to said feedback signal and configured to generate said load control signal such that said voltage level substantially corresponds to a predetermined reference voltage level; and
    a zero-cross detection unit operatively connected between said system power source and said controller, wherein said zero-cross detection unit is configured to detect a zero crossing of said alternating current waveform;
    wherein said controller is configured to use said detected zero-crossing to control activation timing of said load control signal and to synchronize said load control signal with the input command.

2. The voltage regulator of claim 1, wherein said controller is configured to receive a user input signal defining said reference voltage level.

3. The voltage regulator of claim 1, wherein said controller includes a comparator configured to compare the feedback signal with said predetermined reference voltage level and to alter said load control signal accordingly.

4. The voltage regulator of claim 1, wherein said controller comprises a microprocessor.

5. The voltage regulator of claim 1, further comprising a system power source operatively connected to said load control unit and said controller.

6. The voltage regulator of claim 1, further comprising a reset unit operatively connected to said controller.

7. The voltage regulator of claim 1, wherein said load control unit includes a bi-directional switching device having one terminal operatively connected to a system power source, a second terminal operatively connected to said output of said controller, and a third terminal operatively connected to said operating feature.

8. The voltage regulator of claim 7, wherein said switching device comprises a triac.

9. The voltage regulator of claim 7, wherein said load control signal is operative to control a phase-conduction angle of said bi-directional switching device.

10. The voltage regulator of claim 1, wherein said controller is configured to determine a timing signal of said alternating current waveform from said detected zero crossing, said controller thereby controlling activation timing of said load control signal using said timing signal.

11. The voltage regulator of claim 1, wherein said controller is configured to provide proportional-integral (PI) control of said load.

12. The voltage regulator of claim 5, further comprising a power supply configured to generate a predetermined supply voltage rectified from said system power source.

13. The voltage regulator of claim 12, wherein said power supply is operatively connected to said controller to provide said supply voltage to said controller.

14. The voltage regulator of claim 12, further comprising a protection circuit operatively connected between said power supply and said controller to maintain said supply voltage at a constant level.

15. The voltage regulator of claim 1, wherein said feedback signal corresponds to an average voltage level of said alternating current source.

16. The voltage regulator of claim 1, wherein said feedback signal corresponds to a root-mean-squared voltage level of said alternating current source.

* * * * *